US012650721B2

(12) United States Patent
Gao et al.

(10) Patent No.: US 12,650,721 B2
(45) Date of Patent: Jun. 9, 2026

(54) CONTROL METHOD AND ELECTRONIC DEVICE

(71) Applicant: Lenovo (Beijing) Limited, Beijing (CN)

(72) Inventors: Ming Gao, Beijing (CN); Fuxing Ma, Beijing (CN); Liping Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 46 days.

(21) Appl. No.: 18/606,632

(22) Filed: Mar. 15, 2024

(65) Prior Publication Data
US 2024/0329712 A1 Oct. 3, 2024

(30) Foreign Application Priority Data
Mar. 31, 2023 (CN) .......................... 202310343319.3

(51) Int. Cl.
*G06F 1/3209* (2019.01)
*G09G 5/00* (2006.01)
(52) U.S. Cl.
CPC ........... *G06F 1/3209* (2013.01); *G09G 5/005* (2013.01); *G09G 2330/02* (2013.01)
(58) Field of Classification Search
None
See application file for complete search history.

(56) References Cited

U.S. PATENT DOCUMENTS

| | | | | |
|---|---|---|---|---|
| 7,999,804 B2 * | 8/2011 | Wei | ........................ | G09G 5/003 345/212 |
| 2009/0153545 A1 * | 6/2009 | Chou | ..................... | G09G 5/006 345/214 |
| 2013/0235039 A1 * | 9/2013 | Montag | ................ | G09G 3/2092 345/428 |
| 2015/0022722 A1 * | 1/2015 | Yang | ..................... | H04N 5/268 348/705 |
| 2020/0081508 A1 * | 3/2020 | Kobayashi | .......... | G06F 13/4269 |

* cited by examiner

*Primary Examiner* — Kim Huynh
(74) *Attorney, Agent, or Firm* — ANOVA LAW GROUP, PLLC

(57) ABSTRACT

A control method applied to an electronic device includes, in response to detecting that a first interface of the electronic device is accessed to an external device, determining whether the external device is a signal source device of a multi-media signal source, in response to the external device being the signal source device of the multi-media signal source, controlling a multi-media output controller of the electronic device to power on, and controlling the electronic device to switch to a first mode, in the first mode, the electronic device being controlled to be a multi-media output terminal of the external device. In the first mode, the multi-media output controller receives first multi-media data of the external device. First display data of the first multi-media data is converted into a second display signal based on a size of a target display area of a display of the electronic device.

16 Claims, 7 Drawing Sheets

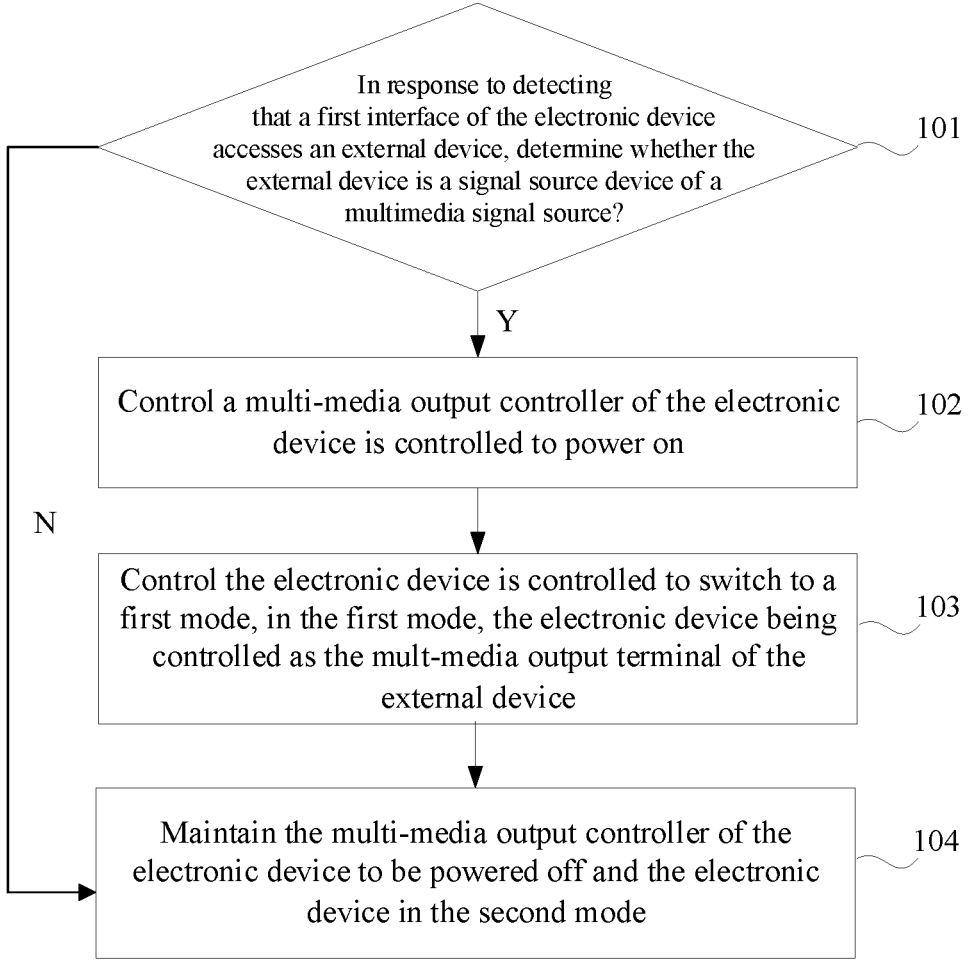

In response to detecting
that a first interface of the electronic device
accesses an external device, determine whether the
external device is a signal source device of a
multimedia signal source?                                    101

Y

Control a multi-media output controller of the electronic
device is controlled to power on                             102

Control the electronic device is controlled to switch to a
first mode, in the first mode, the electronic device being
controlled as the mult-media output terminal of the
external device                                              103

Maintain the multi-media output controller of the
electronic device to be powered off and the electronic
device in the second mode                                    104

CONTROL METHOD AND ELECTRONIC DEVICE

CROSS-REFERENCE TO RELATED APPLICATION

The present disclosure claims priority to Chinese Patent Application No. 202310343319.3, filed on Mar. 31, 2023, the entire content of which is incorporated herein by reference.

TECHNICAL FIELD

The present disclosure relates to the computer technology field and, more particularly, to a control method and an electronic device.

BACKGROUND

Currently, some displays include data transmission interfaces, such as a High Definition Multimedia Interface (HDMI), a Universal Serial Bus (USB), etc., as audio and video input interfaces for audio and video data access. However, with these data transmission interfaces, the main control chips of the displays need to be powered on all the time and maintained in the powered-on state to wait for a handshake signal between an external device and a data transmission interface. Then, system power consumption can increase, which leads to a waste of resources.

SUMMARY

An aspect of the present disclosure provides a control method applied to an electronic device. The method includes, in response to detecting that a first interface of the electronic device is accessed to an external device, determining whether the external device is a signal source device of a multi-media signal source, in response to the external device being the signal source device of the multi-media signal source, controlling a multi-media output controller of the electronic device to power on, and controlling the electronic device to switch to a first mode. In the first mode, the electronic device is controlled to be a multi-media output terminal of the external device. In the first mode, the multi-media output controller receives first multi-media data of the external device. First display data of the first multi-media data is converted into a second display signal based on a size of a target display area of a display of the electronic device. The target display area is a portion of the display.

An aspect of the present disclosure provides an electronic device, including a first interface, a multi-media output controller, and a management component. The management component is configured to, in response to detecting that the first interface of the electronic device is accessed by an external device, determine whether the external device is a signal source device of a multi-media signal source, in response to the external device being the signal source device of the multi-media signal source, control the multi-media output controller of the electronic device to power on, and control the electronic device to switch to a first mode. In the first mode, the electronic device is controlled to be a multi-media output terminal of the external device. In the first mode, the multi-media output controller receives first multi-media data of the external device. First display data of the first multi-media data is converted into a second display signal based on a size of a target display area of a display of the electronic device. The target display area is a portion of the display.

An aspect of the present disclosure provides a non-transitory computer-readable storage medium storing computer instructions that, when executed by one or more processors, cause the one or more processors to, in response to detecting that a first interface of an electronic device is accessed to an external device, determine whether the external device is a signal source device of a multi-media signal source, in response to the external device being the signal source device of the multi-media signal source, control a multi-media output controller of the electronic device to power on, and control the electronic device to switch to a first mode. In the first mode, the electronic device is controlled to be a multi-media output terminal of the external device. In the first mode, the multi-media output controller receives first multi-media data of the external device. First display data of the first multi-media data is converted into a second display signal based on a size of a target display area of a display of the electronic device. The target display area is a portion of the display.

BRIEF DESCRIPTION OF THE DRAWINGS

FIG. 2 illustrates a schematic flowchart of another control method according to some embodiments of the present disclosure.

DETAILED DESCRIPTION OF THE EMBODIMENTS

The technical solution of embodiments of the present disclosure is described in detail in conjunction with the accompanying drawings of embodiments of the present disclosure. Apparently, described embodiments are merely some embodiments of the present disclosure, not all embodiments. Based on embodiments of the present disclosure, all other embodiments obtained by those skilled in the art without creative efforts are within the scope of the present disclosure.

The present disclosure provides a control method and an electronic device. The control method can be applied to electronic devices under various general- or specific-purposed computing apparatus environments or configurations, such as a personal computer, a server computer, a handheld device or portable device, a tablet device, a multi-processor device, etc.

Figure 1:
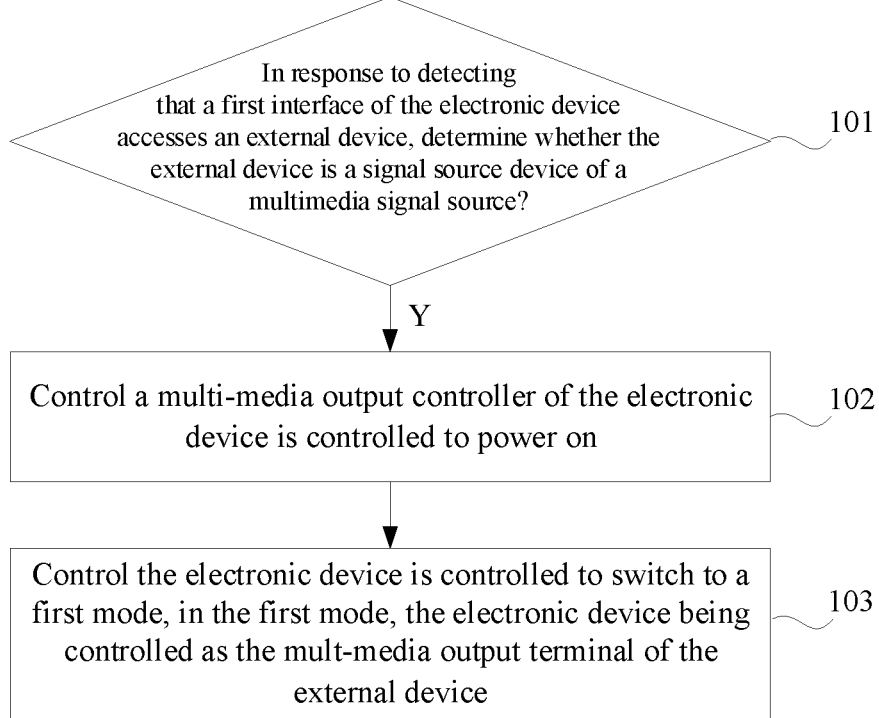
FIG. 1 illustrates a schematic flowchart of a control method according to some embodiments of the present disclosure.

FIG. 1 illustrates a schematic flowchart of a control method according to some embodiments of the present disclosure. The control method includes the following steps.

At 101, in response to detecting that a first interface of the electronic device accesses an external device, whether the external device is a signal source device of a multimedia signal source is determined.

The first interface of the electronic device can include a High-Definition Multimedia Interface (HDMI), a universal serial bus (USB) interface, a DisplayPort (DP) interface, a Thunderbolt interface, etc., which is not limited in the present disclosure. In some embodiments, the first interface can also serve as a power transmission interface for the electronic device.

In the embodiments of the present disclosure, an external device access signal of the first interface of the electronic device can be detected by a management component of the electronic device. If the external device access signal of the first interface is detected, whether the accessed external device is a signal source device of a multimedia signal source can be identified. In some embodiments, whether external device is a display signal source device can be identified.

The electronic device of the present disclosure can negotiate a first handshake with the external device through a power transmission management component to obtain a device parameter of the external device and identify whether the external device is the signal source device of the multimedia signal source according to the obtained device parameter.

For example, the first interface of the electronic device can be a USB Type-C interface. A Power Delivery (PD) protocol chip (referred to as a PD chip) of the electronic device can be used as the power transmission management component to detect the external device access signal of the USB Type-C interface, e.g., detect a DisplayPort handshake signal. When the access signal is detected, the electronic device can negotiate with the external device for the first handshake, obtain device parameter information of the external device during a handshake process, and identify whether the accessed external device is a display signal source device according to the device parameter information.

The obtained device parameter information can include but is not limited to a device identification of the accessed external device, a display-related parameter (such as model, resolution), etc.

The PD chip can detect a signal of the first interface through preset pins. The preset pins can be connected to the first interface and can be but not limited to CC1/CC2 pins.

At 102, if the external device is the signal source device of the multi-media signal source, a multi-media output controller of the electronic device is controlled to power on.

The multimedia output control unit of the electronic device can be in a powered-off state when the first interface of the electronic device does not access the multimedia signal source device to save system power consumption.

The multimedia output controller can be a display main control chip of the electronic device, such as a Scalar chip of the electronic device.

When the external device is accessed to the first interface of the electronic device, if the external device is identified to be the signal source device of a multimedia signal source, the multimedia output controller of the electronic device can be controlled to be powered up. In some embodiments, a power-on command can be sent to the main controller by the power transmission management component of the electronic device. The power-on command can be used to instruct powering on the multimedia output controller. Then, the main controller of the electronic device can control the power supply of the multimedia output controller to power on the multimedia output controller.

In some embodiments, the main controller of the electronic device can include a System on Chip (SOC) or Central Processing Unit (CPU), etc., depending on the type of the electronic device.

For example, the electronic device can be a tablet computer. The main controller can be the SOC of the tablet computer. When the external device is accessed by the USB Type-C interface of the tablet computer, the PD chip of the tablet computer can identify whether the accessed external device is a display signal source device. If the external device is a display signal source device, a power-on notification signal can be sent to the SOC. The SOC can control the power supply of the Scalar chip to power on the Scalar chip based on the signal.

At 103, the electronic device is controlled to switch to a first mode.

After the multimedia output controller is powered on, the electronic device can be controlled to switch to the first mode based on the powered-on multimedia output controller.

In the present disclosure, the electronic device can include a first mode and a second mode. In the first mode, the electronic device can be controlled as a multimedia output terminal of the accessed external device. In the second mode, the display signal of the electronic device is displayed on the display of the electronic device. That is, in the first mode, the display of the electronic device displays the display signal of the external device, and in the second mode, the display of the electronic device displays the display signal of the electronic device.

In this step, the electronic device can be controlled to switch from the second mode to the first mode.

The electronic device can perform second handshake negotiation with the external device by using the multimedia output controller of the electronic device to obtain the first display parameter of the external device based on the second negotiation. In response to completing the second handshake negotiation, the electronic device can enter the first mode from the second mode.

For example, after the display main control chip Scalar is powered on, the Scalar chip can further conduct a handshake with the external device (second handshake negotiation) through the PD protocol. Based on the handshake process, the first display parameter of the external device can be obtained, including but not limited to a display screen size, resolution, and frame rate of the external device. After the handshake is ended, the electronic device can enter the first mode by default, which can also be referred to as the display mode of the electronic device.

In embodiments of the present disclosure, after detecting that the external device is accessed by the first interface of the electronic device is the signal source device of the multi-media signal source and controlling the multi-media output controller of the electronic device is powered on, the electronic device can be controlled to switch to the first mode. Thus, the electronic device can be controlled to be the multi-media output terminal of the accessed external device to support the multi-media output terminal to output the multi-media data of the external device.

In the first mode, the multimedia output controller of the electronic device can receive the first multimedia data of the external device. Based on the size of the target display area of the electronic device display screen, the first display data of the first multimedia data can be converted into a second display signal. The target display area can be at least a partial area of the display of the electronic device, e.g., a part or all area of the entire display area of the display of the electronic device. The display of the electronic device can be a display or an external display of the electronic device, which is not limited.

Furthermore, based on the first display parameter of the external device and the second display parameter corresponding to the size of the target display area of the display of the electronic device, the first display data of the first multimedia data can be converted into the second display signal. The second display parameter can include but is not limited to the size and resolution of the target display area of the display of the electronic device.

In some embodiments, the first display content corresponding to the first display data can be the same as the second display content corresponding to the second display signal. The first display content corresponding to the first display data can have a first display format, while the second display content corresponding to the second display signal can have a second display format. In some embodiments, the first display format can be different from the second display format.

For example, the external device can be a DP Source Device, and the electronic device can be a tablet computer. The first display format can be a DP protocol format, while the second display format can be a Mobile Industry Processor Interface (MIPI) protocol format corresponding to an MIPI display of the tablet computer.

The first multimedia data of the external device can include display data, i.e., the first display data, and can also include audio data.

After receiving the first multimedia data of the external device, the multimedia output controller can separate the first display data and the audio data and perform format conversion on the first display data and adaptation processing on the display parameter to obtain the second display signal. Then, the second display signal can be outputted to the display of the electronic device. Thus, the electronic device can be used as the multi-media output terminal to display the display signal of the external device. For example, the Scalar chip can separate the first display data of the DP format from the received first multi-media data and convert the first display data of the DP format into the MIPI protocol format. The Scalar chip can also process the display data of the MIPI protocol format into the second display signal that is adapted with the second display parameter (e.g., the resolution of the target display area) corresponding to the size of the target display area of the display of the electronic device and transmit the second display signal to the display of the electronic device for display.

Similarly, for the separated audio data, the multimedia output controller of the electronic device can perform format conversion on the audio data and transmit the audio data after the format conversion to the corresponding audio output apparatus for audio output. For example, the scalar chip can cover the separated audio data into the I2S protocol format required by the electronic device and transmit the audio data of the I2S format to a speaker (SPK) for audio output.

In summary, in the control method of the present disclosure, in response to detecting that the first interface of the electronic device accesses the external device, whether the external device is the signal source device of the multimedia signal source can be determined. When the external device is the signal source device of the multi-media signal source, the multi-media output controller of the electronic device can be controlled to be powered on, and the electronic device can be controlled to perform mode switching to switch the electronic device to the first mode, in which the electronic device can be used as the multi-media output terminal of the external device. Meanwhile, the multi-media output controller of the electronic device can be prevented from being powered on continuously to save the system power consumption of the electronic device to avoid the waste of resources.

In some embodiments, the control method of the present disclosure can further include the following processes.

Based on the first handshake negotiation, predetermined identification information can be sent to the external device through the power supply transmission management component of the electronic device.

The predetermined identification information can be used to represent that the electronic device can be used as the multi-media output terminal of the external device.

For example, when a DP Source Device or similar external device is plugged into the USB Type-C interface of the electronic device, the PD chip of the electronic device can first interact with the external device, perform the first handshake negotiation, and identify whether the external device is the signal source device of the multi-media signal source. If the external device is the signal source device of the multi-media signal source, the PD chip can send the predetermined identification information to the external device, and inform the external device that the electronic device is a DP Sink to indicate that the electronic device can be used as the multi-media output terminal of the external device.

After sending the predetermined identification information to the external device, the power supply transmission management component of the electronic device may not send predetermined confirmation information, which is used to indicate that the electronic device is communicatively connected to the external device, to the external device but send a power-on command to the main controller. After the main controller causes the multi-media output controller to be powered on, the power supply transmission management component of the electronic device can send the predetermined confirmation information. Correspondingly, in the present disclosure, after controlling the multi-media output controller is powered on, the method further can include sending the predetermined confirmation information to the external device through the power supply transmission management component of the electronic device to end the first handshake negotiation.

The power supply transmission management component can send the power-on command to the main controller. The power-on command can be sent before or after the predetermined identification information is sent or simultaneously with the predetermined identification information, which is not limited.

According to the above example, after notifying the external device that the electronic device is the DP Sink, the PD protocol chip may not send Hot Plug Detect (HPD) information to the external device first but send a power-on notification signal to the SOC of the electronic device. The SOC can control the Scalar power supply to power on the Scalar chip according to the received signal. After the Scalar chip is powered on, the SOC can be notified, and then the SOC can notify the PD chip. The PD chip can send the HPD information to the external device according to the received notification signal to notify the external device that the electronic device and the external device are connected.

Subsequently, the second handshake negotiation between the electronic device and the external device can be further performed at the multi-media output controller of the electronic device. Through the two handshakes between the power supply transmission management component of the electronic device and the external device and between the multi-media output controller of the electronic device and the external device, the electronic device can be controlled to be the multi-media output terminal of the external device. When the electronic device does not access the external device, the multi-media output controller of the electronic device may not need to be powered on, which saves the system power consumption of the electronic device and avoids the waste of resources.

In some embodiments, as shown in the flowchart of the control method in FIG. 2, the control method of the present disclosure further includes the following steps.

At 104, if the external device is not the signal source device of the multi-media signal source, the multi-media output controller of the electronic device is maintained to be powered off, and the electronic device is maintained in the second mode.

If the external device is not the signal source device of the multimedia signal source, the current state of the electronic device can be maintained. That is, the powered-off state of the multi-media output controller of the electronic device can be maintained, and the second mode of the electronic device can be maintained. For example, the powered-off state of the Scalar chip of the tablet computer can be maintained, and the tablet mode of the tablet computer can be maintained. In the second mode, the electronic device such as the tablet computer can display information on the display of the electronic device based on the display signal of the electronic device, e.g., the display signal provided by the SOC.

Similarly, in the second mode, based on the audio signal of the electronic device, the audio can be outputted at the audio output apparatus of the electronic device, such as the SPK.

When the electronic device is not accessed by the signal source device of the multimedia signal source, the multi-media output controller can be controlled to be in the powered-off state to save the system power consumption and avoid the waste of resources.

Figure 3:
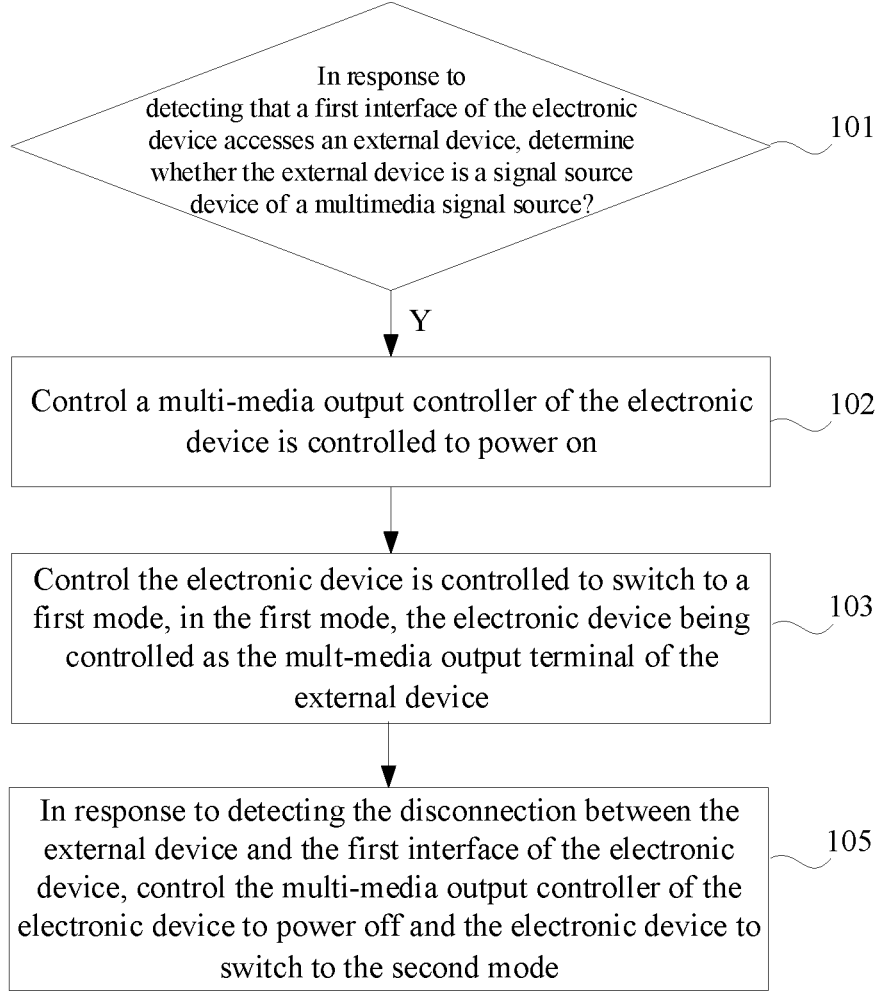
FIG. 3 illustrates a schematic flowchart of another control method according to some embodiments of the present disclosure.

In some embodiments, as shown in the flowchart of the control method in FIG. 3, the control method of the present disclosure further includes the following steps.

At 105, in response to detecting the disconnection between the external device and the first interface of the electronic device, the multi-media output controller of the electronic device is controlled to power off, and the electronic device is controlled to switch to the second mode.

After the external device is disconnected from the first interface of the electronic device, the multi-media output controller of the electronic device can be controlled to be powered off, and the electronic device can be controlled to switch to the second mode (e.g., the tablet mode of the tablet computer). Thus, based on the second mode, information can be displayed on the display of the electronic device using the display signal of the electronic device.

The display signal of the electronic device can include, but is not limited to, the display signal provided by the SOC of the electronic device.

In some embodiments, when the power supply transmission management component of the electronic device detects the disconnection between the external device and the first interface, the power supply transmission management component can send the power-off command to the main controller of the electronic device. The main controller can control the multi-media output controller to be powered off based on the command and control the electronic device to enter the second mode. For example, the PD chip can send a notification signal indicating power off the SOC. The SOC can obtain the notification signal and control the Scalar chip to be powered off. Moreover, the transmission channel of the display signal between the SOC and the display of the electronic device can be established to control the electronic device to enter the second mode.

In some embodiments, after the external device is disconnected from the first interface, the multi-media output controller of the electronic device can be controlled to be powered off in time to further reduce the system power consumption and avoid the waste of resources.

An application example of the control method of the present disclosure is described below.

Figure 4:
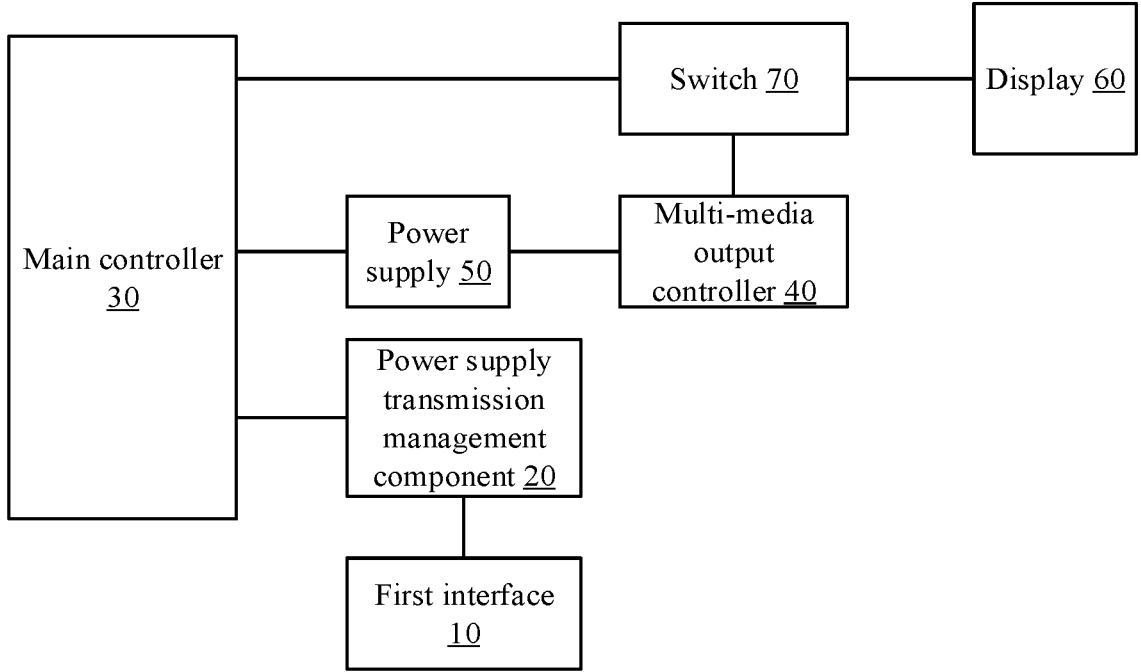
FIG. 4 illustrates a schematic structural diagram of a control circuit of an electronic device according to some embodiments of the present disclosure.

FIG. 4 illustrates a schematic structural diagram of a control circuit of an electronic device according to some embodiments of the present disclosure. The control circuit includes a first interface 10, a power supply transmission management component 20 connected to the first interface 10, a main controller 30 connected to the power supply transmission management component 20, a multi-media output controller 40 connected to the main controller 30, a power supply 50 of the multi-media output controller 40, and a display 60, a switch 70. The power supply 50 is connected between the main controller 30 and the multi-media output controller 40. The main controller 30 and the multi-media output controller 40 are connected to the display 60 through the switch 70.

When the external device is accessed by the first interface 10, the power supply transmission management component 20 can, in response to detecting the access signal, identify whether the external device is a signal source device of a multi-media signal source, and when the external device is identified as the signal source device of the multi-media signal source, control the power supply 50 to power on the multi-media output controller 40 through the main controller 30. After the multi-media output controller 40 is powered on, the display parameter of the external device can be obtained through the handshake with the external device. After the handshake ends, the electronic device can automatically enter the first mode, in which the electronic device can be used as the multimedia output terminal for the external device.

Figure 5:
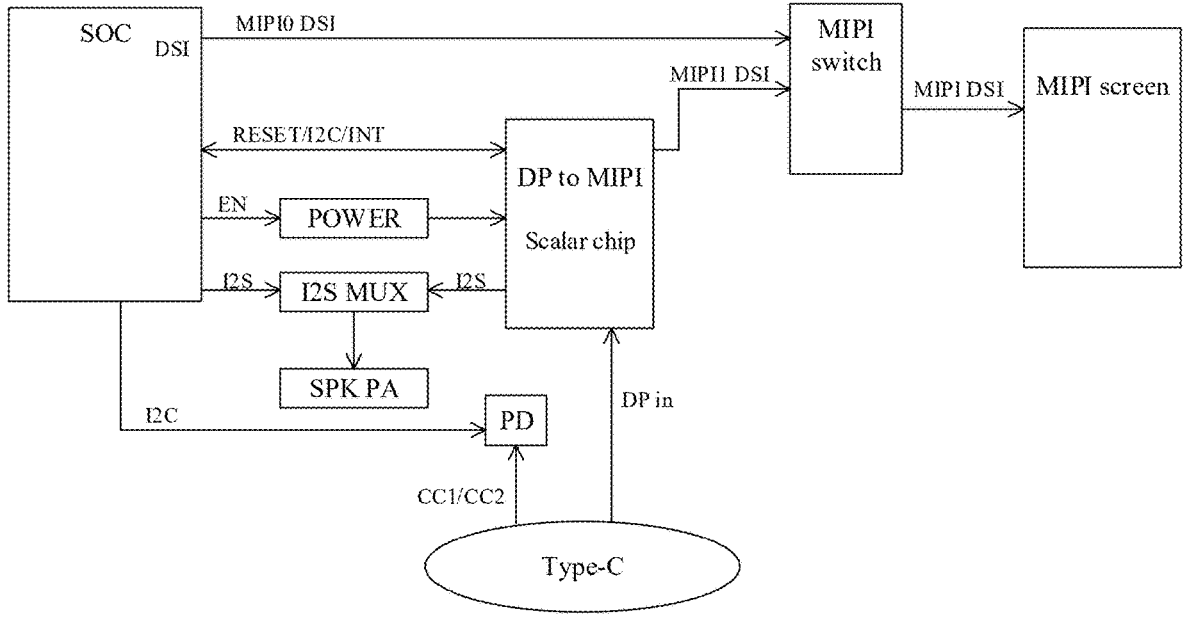
FIG. 5 illustrates a schematic diagram of an example of the control circuit in FIG. 4.

FIG. 5 illustrates a schematic diagram of an example of the control circuit in FIG. 4. "Type-C" represents a USB Type-C interface, which is used as the first interface 10. "PD" represents the PD chip, which is used as the power supply transmission management component 20, "main controller 30" and "multi-media output controller 40" are implemented as the SOC and Scalar chip in FIG. 5, respectively. "power supply 50" is POWER connected between the SOC and the Scalar chip in FIG. 5. "display 60" and "switch 70" are implemented as MIPI screen and MIPI switch in FIG. 5, respectively. The connection relationships among the components are shown in FIG. 5.

Figure 6:
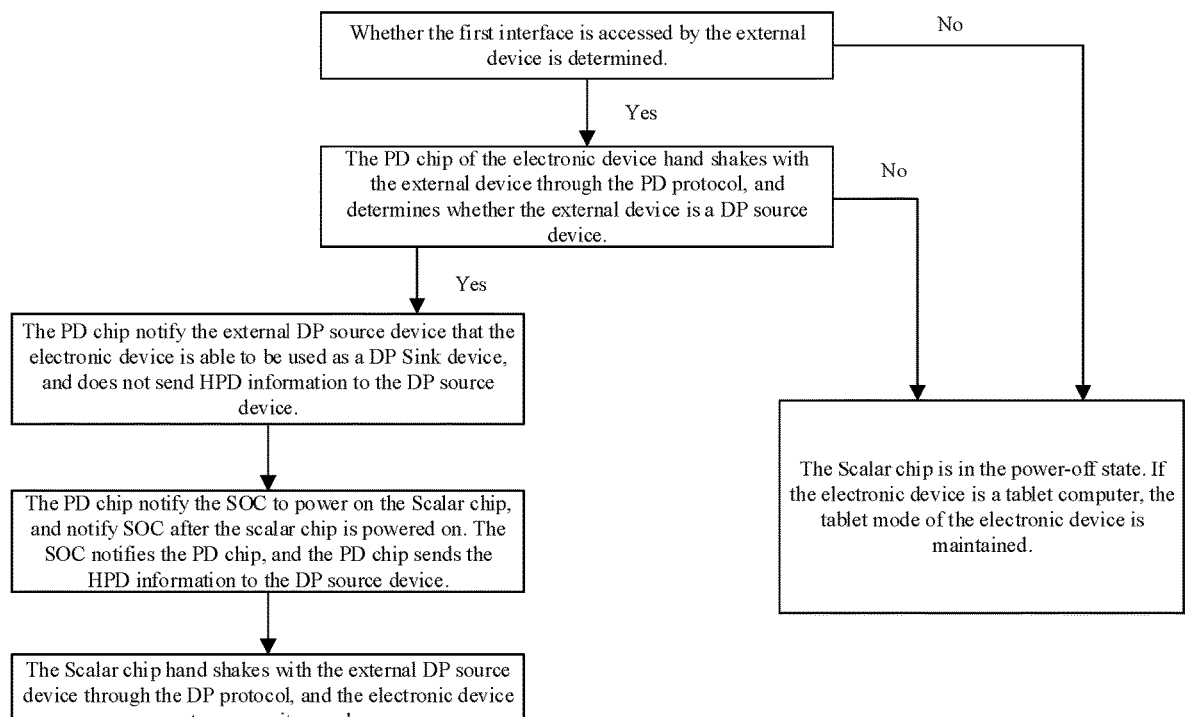
FIG. 6 illustrates a schematic flowchart showing an operation process of the circuit in FIG. 5.

A detailed operational process corresponding to the circuit structure in FIG. 5 is illustrated in FIG. 6.

When an external device such as a DP Source device is accessed by the first interface such as the USB Type-C of the electronic device, the PD chip of the electronic device can shake hands with the external device through the PD protocol to perform the first handshake negotiation with the external device to obtain the device parameter of the external device and identify whether the external device is a multi-media signal source device such as the DP source.

If the accessed external device is the multi-media signal source device such as the DP Source, the PD chip can send the predetermined identification information to the external device through the first handshake negotiation to notify the external device that the electronic device can be used as a DP sink device. However, HPD information may not send to the external device at this time. The PD chip can send a power-on notification signal to the SOC to notify the SOC to power on the Scalar chip. After the Scalar chip is powered on, the SOC can be notified. Then, the SOC can notify the PD chip, and the PD chip can then send the HPD information to the external device such as the DP Source device. Then, the Scalar chip can further shake hands with the DP Source device through the DP protocol, i.e., perform the second handshake negotiation with the external device. After the handshake ends, the electronic device can enter the display mode (the first mode). Thus, in the first mode, the electronic device can be used as the multi-media output terminal of the electronic device to output the multi-media data provided by the external device.

Thus, in FIG. 5, the MIPI switch connects the Scalar chip with the MIPI screen. The display signal of the MIPI screen is from the Scalar chip, and the display signal provided by the Scalar chip is further from the external device.

If no external device is accessed or the accessed external device is not the multi-media signal source device such as the DP Source, the Scalar chip of the electronic device can be maintained to be powered off, and the electronic device can be maintained in the second mode. In some embodiments, if the electronic device is a tablet computer, the electronic device can be maintained in the tablet mode. Thus, the tablet computer can display based on the display signal of the tablet computer. As shown in FIG. 5, the MIPI switch connects the SOC to the MIPI screen, and the display signal of the MIPI screen is from the SOC.

Figure 7:
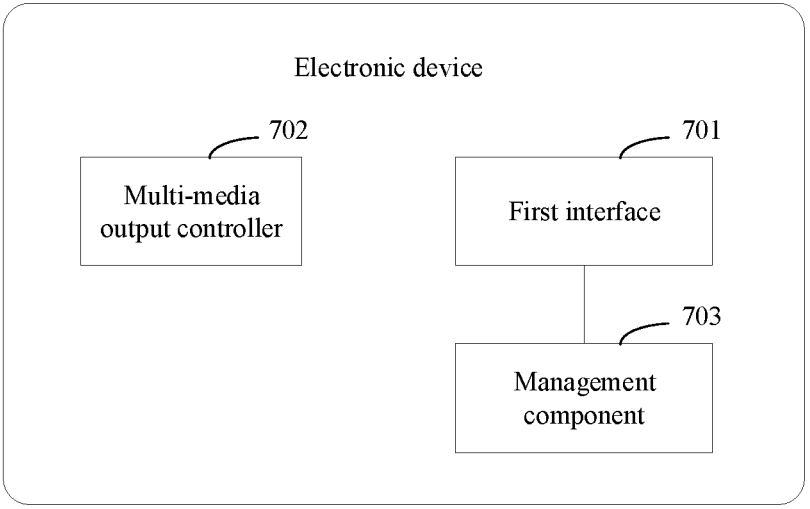
FIG. 7 illustrates a schematic structural diagram of an electronic device according to some embodiments of the present disclosure.

Embodiments of the present disclosure further provide an electronic device. The structure of the electronic device is shown in FIG. 7 and includes a first interface 701, a multi-media output controller 702, and a management component 703.

The management component 703 can be configured to, in response to detecting that the first interface is accessed by the external device, determine whether the external device is a signal source device of the multi-media signal source, if the external device is the signal source device of the multi-media signal source, control the multi-media output controller to be powered on, and control the electronic device to switch to the first mode. In the first mode, the electronic device can be used as the multi-media output terminal of the external device.

In the first mode, the multi-media output controller can receive the first multi-media data provided by the external device. Based on the size of the target display area of the display of the electronic device, the first display data of the first multi-media data can be converted into a second display signal. The target display area can be at least a portion of the display.

In some embodiments, the management component 703 can be the power supply transmission management component of the electronic device.

The management component 703 can be also configured to perform the first handshake negotiation with the external device, based on the first handshake negotiation, and send the predetermined identification information to the external device. The predetermined identification information can indicate that the electronic device can be used as the multimedia output terminal of the external device. The external device can be the signal source device of the multimedia signal source determined through the first handshake negotiation performed by the power supply transmission management component of the electronic device with the external device.

In some embodiments, the electronic device can further include a main controller.

When controlling the multi-media output controller to be powered on, the management component 703 can be configured to send the power-on command to the main controller, the power-on command being used to indicate to power on the multi-media output controller, and control the power supply of the multi-media output controller to power on the multi-media output controller through the main controller.

After the multimedia output controller is powered on, the management component 703 can be further configured to send the predetermined confirmation information to the external device to end the first handshake negotiation. The predetermined confirmation information can be used to indicate that the electronic device has established a communicative connection with the external device.

In some embodiments, when controlling the electronic device to switch to the first mode, the management component 703 can be configured to perform the second handshake negotiation with the external device through the multi-media output controller to obtain the first display parameter of the external device based on the second handshake negotiation. In response to completing the second handshake negotiation, the electronic device can enter the first mode.

When converting the first display data of the first multimedia data into the second display signal based on the size of the target display area of the display of the electronic device, the electronic device can be configured to, based on the first display parameter of the external device and the second display parameter corresponding to the size of the target display area, convert the first display data of the first multi-media data into the second display signal.

The first display content corresponding to the first display data can be the same as the second display content corresponding to the second display signal. The first display content corresponding to the first display data can have a first display format, and the second display content corresponding to the second display signal can have a second display format. The first display format can be different from the second display format.

The management unit 703 can be further configured to maintain the powered-off state of the multi-media output controller and maintain the second mode of the electronic device when the external device is not the signal source device of the multi-media signal source, and perform information display on the display using the display signal of the electronic device in the second mode.

The electronic device of embodiments of the present disclosure can correspond to the control method above. For details on the implementation of the components and the control processes corresponding to the components of the electronic device, reference can be made to the related description of the control method above, which is not repeated here.

Embodiments of the present disclosure are described in a progressive manner, and each embodiment focuses on the differences from other embodiments. The parts that are the same or similar between the embodiments can be cross-referenced.

To achieve convenience in description, when the system or device above is described as being divided into various modules or units based on functions, which are described separately. When the present disclosure is implemented, functions of the units can be implemented in one or more pieces of software and/or hardware.

Through the description of the above embodiments, those skilled in the art can clearly understand that the present disclosure can be implemented by the software with the general hardware platform. Based on this understanding, the essence of the technical solution of the present disclosure or the part contributing to the existing technology can be embodied in the form of the software product. The computer software product can be stored in the storage medium, such as ROM/RAM, disk, CD, etc., and includes several instructions used to cause a computer device (such as a personal computer, server, network device, etc.) to execute the method of embodiments or some parts of the embodiments of the present disclosure.

In the present specification, relationship terms such as "first," "second," "third," "fourth," etc., are merely used to distinguish one entity or operation from another, without necessarily requiring or implying any actual relationship or sequence between these entities or operations. Moreover, the terms "comprising," "including," or any other variations thereof, are intended to cover non-exclusive inclusion, so that a process, method, article, or device including a series of elements includes not only those elements explicitly listed, but also other elements that are not explicitly listed, or further includes the elements inherent to the process, method, article, or device. When there is no more limitation, an element defined by the phrase "including one . . . ," does not exclude another identical element existing in the process, method, entity, or device including the element.

The above are some embodiments of the present disclosure. For those skilled in the art, without departing from the principle of the present disclosure, various improvements and decorations can be made. These improvements and decorations can be also within the scope of the present disclosure.

What is claimed is:

1. A control method applied to an electronic device comprising:

in response to detecting that a first interface of the electronic device is accessed to an external device, determining whether the external device is a signal source device of a multi-media signal source, including performing first handshake negotiation with the external device through a power supply transmission management component of the electronic device;

in response to the external device being the signal source device of the multi-media signal source, controlling a multi-media output controller of the electronic device to power on;

after powering on the multi-media output controller, sending predetermined confirmation information to the external device through the power supply transmission management component to end the first handshake negotiation, the predetermined confirmation information being used to indicate that the electronic device completes establishing a communicative connection with the external device; and controlling the electronic device to switch to a first mode, in the first mode, the electronic device being controlled to be a multi-media output terminal of the external device;

wherein:

in the first mode, the multi-media output controller receives first multi-media data of the external device;

first display data of the first multi-media data is converted into a second display signal based on a size of a target display area of a display of the electronic device; and the target display area is a portion of the display.

2. The method according to claim 1, wherein determining whether the external device is the signal source device of the multi-media signal source further includes:

based on the first handshake negotiation, sending predetermined identification information to the external device through the power supply transmission management component, the predetermined identification information being used to indicate that the electronic device is able to be used as the multi-media output terminal of the external device.

3. The method according to claim 2, wherein controlling the multi-media output controller of the electronic device to power on includes:

sending a power-on command to a main controller of the electronic device through the power supply transmission management component, the power-on command being used to instruct the multi-media output controller to power on; and controlling a power supply of the multi-media output controller to power on the multi-media output controller through the main controller.

4. The method according to claim 1, wherein:

controlling the electronic device to switch to the first mode includes:

performing second handshake negotiation with the external device through the multi-media output controller to obtain a first display parameter of the external device based on the second handshake negotiation, in response to completing the second handshake negotiation, the electronic device entering the first mode; and converting the first display data of the first multi-media data into the second display signal based on the size of the target display area of the display of the electronic device includes:

based on the first display parameter and a second display parameter corresponding to the size of the target display area, converting the first display data of the first multi-media data into the second display signal;

wherein:

a first display content corresponding to the first display data is the same as a second display content corresponding to the second display signal;

the first display content has a first display format, and the second display content has a second display format; and the first display format is different from the second display format.

5. The method according to claim 1, further comprising:

in response to the external device being not the signal source device of the multi-media signal source, maintaining a powered-off state of the multi-media output controller and a second mode of the electronic device; and in the second mode, performing information display on the display using a display signal of the electronic device.

6. An electronic device comprising:

a first interface;

a multi-media output controller; and a management component configured to perform the method according to claim 1.

7. The device according to claim 6, wherein the management component is a power supply transmission management component of the electronic device and further configured to:

based on the first handshake negotiation, send predetermined identification information to the external device, the predetermined identification information being used to indicate that the electronic device is able to be used as the multi-media output terminal of the external device.

8. The device according to claim 7, further comprising a main controller, wherein:

when the management component controls the multi-media output controller to power on, the management component is further configured to:

send a power-on command to the main controller, the power-on command being used to instruct the multi-media output controller to power on; and control a power supply of the multi-media output controller to power on the multi-media output controller through the main controller.

9. The device according to claim 6, wherein:

when controlling the electronic device to switch to the first mode, the management component is further configured to:

perform second handshake negotiation with the external device through the multi-media output controller to obtain a first display parameter of the external device based on the second handshake negotiation, in response to completing the second handshake negotiation, the electronic device entering the first mode; and when converting the first display data of the first multi-media data into the second display signal based on the size of the target display area of the display of the electronic device, the management component is further configured to:

based on the first display parameter and a second display parameter corresponding to the size of the target display area, convert the first display data of the first multi-media data into the second display signal;

wherein:

a first display content corresponding to the first display data is the same as a second display content corresponding to the second display signal;

the first display content has a first display format, and the second display content has a second display format; and the first display format is different from the second display format.

10. A non-transitory computer-readable storage medium storing computer instructions that, when executed by one or more processors, cause the one or more processors to perform the method according to claim 1.

11. The storage medium according to claim 10, wherein the one or more processors are further configured to:

based on the first handshake negotiation, send predetermined identification information to the external device, the predetermined identification information being used to indicate that the electronic device is able to be used as the multi-media output terminal of the external device.

12. The storage medium according to claim 11, wherein the one or more processors are further configured to:

send a power-on command to a main controller of the electronic device, the power-on command being used to instruct the multi-media output controller to power on; and control a power supply of the multi-media output controller to power on the multi-media output controller through the main controller.

13. The storage medium according to claim 10, wherein the one or more processors are further configured to:

perform second handshake negotiation with the external device through the multi-media output controller to obtain a first display parameter of the external device based on the second handshake negotiation, in response to completing the second handshake negotiation, the electronic device entering the first mode; and based on the first display parameter and a second display parameter corresponding to the size of the target display area, convert the first display data of the first multi-media data into the second display signal;

wherein:

a first display content corresponding to the first display data is the same as a second display content corresponding to the second display signal;

the first display content has a first display format, and the second display content has a second display format; and the first display format is different from the second display format.

14. The storage medium according to claim 10, wherein the one or more processors are further configured to:

in response to the external device being not the signal source device of the multi-media signal source, maintain a powered-off state of the multi-media output controller and a second mode of the electronic device; and in the second mode, perform information display on the display using a display signal of the electronic device.

15. A control method applied to an electronic device comprising:

in response to detecting that a first interface of the electronic device is accessed to an external device, determining whether the external device is a signal source device of a multi-media signal source, including:

performing first handshake negotiation with the external device through a power supply transmission management component of the electronic device; and based on the first handshake negotiation, sending predetermined identification information to the external device through the power supply transmission management component, the predetermined identification information being used to indicate that the electronic device is able to be used as the multi-media output terminal of the external device;

in response to the external device being the signal source device of the multi-media signal source, controlling a multi-media output controller of the electronic device to power on; and controlling the electronic device to switch to a first mode, in the first mode, the electronic device being controlled to be a multi-media output terminal of the external device, and controlling the multi-media output controller of the electronic device to power on including:

sending a power-on command to a main controller of the electronic device through the power supply transmission management component, the power-on command being used to instruct the multi-media output controller to power on; and controlling a power supply of the multi-media output controller to power on the multi-media output controller through the main controller;

wherein:

in the first mode, the multi-media output controller receives first multi-media data of the external device;

first display data of the first multi-media data is converted into a second display signal based on a size of a target display area of a display of the electronic device; and the target display area is a portion of the display.

16. A control method applied to an electronic device comprising:

in response to detecting that a first interface of the electronic device is accessed to an external device, determining whether the external device is a signal source device of a multi-media signal source;

in response to the external device being the signal source device of the multi-media signal source, controlling a multi-media output controller of the electronic device to power on; and controlling the electronic device to switch to a first mode, in the first mode, the electronic device being controlled to be a multi-media output terminal of the external device, and controlling the electronic device to switch to the first mode including:

performing handshake negotiation with the external device through a multi-media output controller to obtain a first display parameter of the external device based on the handshake negotiation, in response to completing the handshake negotiation, the electronic device entering the first mode, in the first mode, the multi-media output controller receiving first multi-media data of the external device; and converting the first display data of the first multi-media data into a second display signal based on a size of a target display area of a display of the electronic device, including:

based on the first display parameter and a second display parameter corresponding to the size of the target display area, converting the first display data of the first multi-media data into the second display signal;

wherein:

the target display area is a portion of the display;

a first display content corresponding to the first display data is the same as a second display content corresponding to the second display signal;

the first display content has a first display format, and the second display content has a second display format; and the first display format is different from the second display format.

* * * * *